United States Patent [19]

Kigawa et al.

[11] 4,413,929
[45] Nov. 8, 1983

[54] ROCK BOLT

[75] Inventors: Tomio Kigawa, Matsubara; Kouetsu Fukui, Kawasaki, both of Japan

[73] Assignee: Kubota, Ltd., Osaka, Japan

[21] Appl. No.: 471,136

[22] Filed: Mar. 1, 1983

Related U.S. Application Data

[63] Continuation of Ser. No. 217,145, Dec. 16, 1980, abandoned.

[30] Foreign Application Priority Data

Dec. 18, 1979 [JP] Japan .................................. 54-165347

[51] Int. Cl.³ .............................................. E02D 20/02
[52] U.S. Cl. .................... 405/260; 405/244; 405/237
[58] Field of Search ............... 405/260, 244, 239, 240, 405/236, 227, 267, 269, 261, 262; 166/187, 285

[56] References Cited

U.S. PATENT DOCUMENTS

| 3,032,115 | 5/1962 | Smith ................................... 166/187 |
| 3,259,192 | 7/1966 | Hyde ............................... 166/187 X |
| 3,289,761 | 12/1966 | Smith et al. ...................... 166/187 X |
| 3,303,244 | 2/1967 | Talley et al. ..................... 405/237 X |
| 3,393,744 | 7/1968 | Fagg et al. .......................... 166/187 |
| 3,492,823 | 2/1970 | Lamberton ...................... 405/244 X |
| 3,494,134 | 2/1970 | Jorge ................................... 405/260 |
| 3,518,835 | 7/1970 | Gnaedinger ......................... 405/269 |
| 3,685,303 | 8/1972 | Turzillo .......................... 405/237 X |
| 4,247,223 | 1/1981 | Amakasu et al. ................ 405/260 X |

FOREIGN PATENT DOCUMENTS

| 84938 | 12/1954 | Norway .............................. 405/260 |
| 564654 | 7/1975 | Switzerland ........................ 405/260 |
| 1007393 | 10/1965 | United Kingdom ................ 405/260 |
| 1550619 | 8/1979 | United Kingdom ................ 405/260 |

Primary Examiner—Dennis L. Taylor
Attorney, Agent, or Firm—Cushman, Darby & Cushman

[57] ABSTRACT

A rock bolt comprising a bolt body, a bag member directly surrounding an outer periphery of the bolt body adjacent to one end thereof, retainer means for securely fixing the bag member direct to the bolt body, a first tube means for feeding packing material into the bag member and extending through the bag member and toward the other end of the bolt body. The packing material filled into the bag member acts to lid or plug the hole into which the rock bolt has been inserted.

10 Claims, 8 Drawing Figures

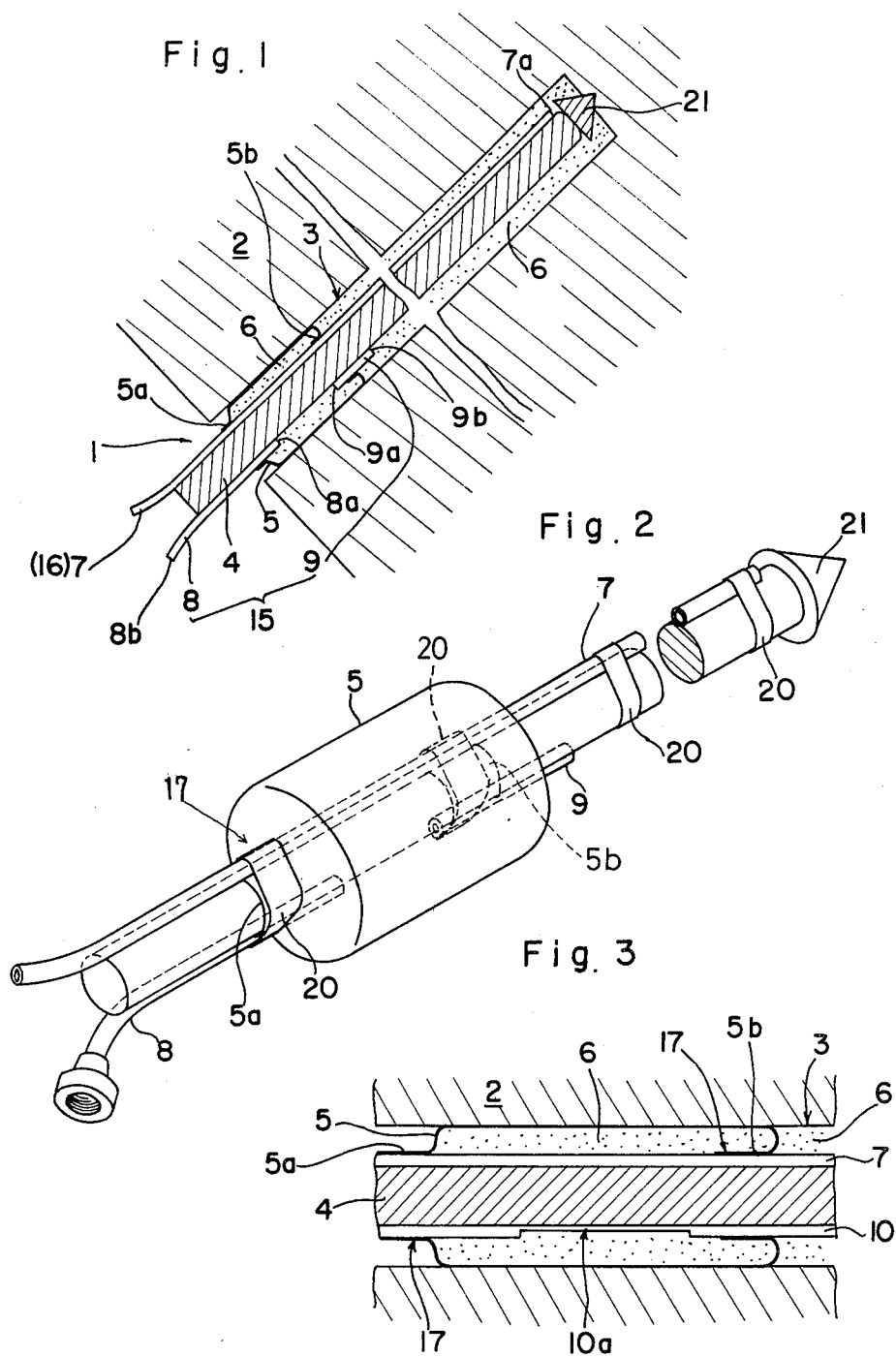

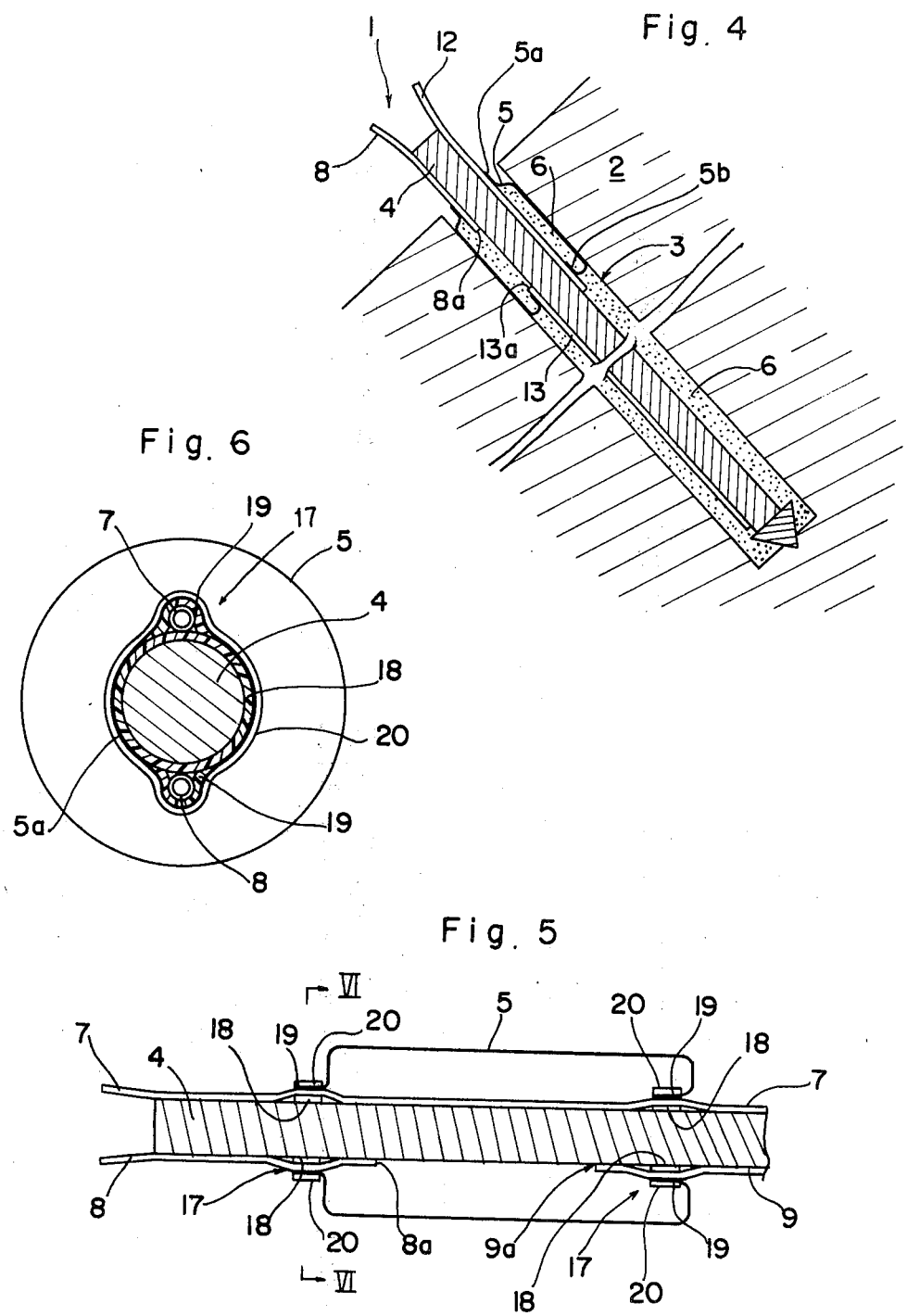

ROCK BOLT

This is a continuation, of application Ser. No. 217,145, filed Dec. 16, 1980, now abandoned.

BACKGROUND OF THE INVENTION (1) Field of the Invention

The rock bolts used in tunneling work to support the natural ground at the inner periphery of the tunnel are classified broadly into the tightening type and the overall adhesion type. The present invention relates to an improvement in the overall adhesion type rock bolt.

(2) Description of the Prior Art

In order to settle a rock bolt in a hole bored in the inner periphery of a tunnel, the rock bolt used in conventional practice is provided with a tubular resilient element or the like securely fitted on one end of the bolt body to fix the bolt body in the interior of the hole and to plug the mouth of the hole. The rock bolt is inserted into the hole and is fixed therein by means of the resilient element or the like, and at the same time the mouth of the hole is plugged by the resilient element or the like. Thereafter packing material such as mortar or cement paste is directly fed into the hole to fill its interior. However, this structure involves a troublesome insertion of the rock bolt into the hole in that the resilient element is fitted on the bolt body. Furthermore, there is a disadvantage of imperfect plugging of the mouth of the hole when the hole has uneven inner wall surfaces adjacent to the mouth. More particularly, while the resilient element which is a manufactured product having a certain outer shape is used to plug the hole, the mouth of the hole may have a larger diameter than expected or may become rugged because it crumbles depending on the nature of the soil or due to vibrations of the boring work. Therefore, the resilient element having a predetermined shape is not always effective to plug the mouth of the hole. Consequently, the packing material injected into the hole will flow out through the gap between the resilient element and the opposed soil.

Besides the tubular resilient element, varied structures have been practised as means for plugging such holes but most of them are complicated or involve many components.

SUMMARY OF THE INVENTION

Having regard to the above state of the art, the object of the present invention is to provide a rock bolt which is easy to insert into the hole and yet effective to completely plug its mouth.

In order to achieve the above object, a rock bolt according to the pesent invention comprises a bolt body, a bag member directly surrounding an outer periphery of the bolt body adjacent to one end thereof, retainer means for securely fixing the bag member direct to the bolt body, and a first tube means extending from adjacent the one end of the bolt body through the bag member toward the other end of the bolt body and having openings to communicate with interior of the bag member.

This rock bolt is inserted into the hole formed in the natural ground without any packing material in the bag member, and its insertion is therefore carried out with ease. The mouth of the hole is plugged by filling the bag member with packing material. This assures a reliable plugging of the mouth of the hole even if the inner wall surfaces adjacent thereto are rugged. This plugging is also more reliable than the conventional plugging by the resilient element where the mouth of the hole has a somewhat large diameter after crumbling of adjacent soil. Thus the invention provides a rock bolt of desired strength by preventing the packing material from flowing out of the hole.

Other objects and advantages of the present invention will be apparent from the following description.

BRIEF DESCRIPTION OF THE DRAWINGS

The drawings illustrate the rock bolt according to the present invention, in which:

FIG. 1 is a side view in vertical section of the rock bolt settled in an upwardly inclined hole, FIG. 2 is an enlarged perspective view of principal portions of the rock bolt, FIG. 3 is an enlarged side view in vertical section of the rock bolt according to a modified embodiment, FIG. 4 is a side view in vertical section of the rock bolt according to another embodiment as settled in a downwardly inclined hole, FIG. 5 is a side view in vertical section of the principal portions of the rock bolt showing a modified retainer means for retaining the bag member, FIG. 6 is a sectional view taken on line VI—VI of FIG. 5.

DESCRIPTION OF THE PREFERRED EMBODIMENTS

Figure 7:
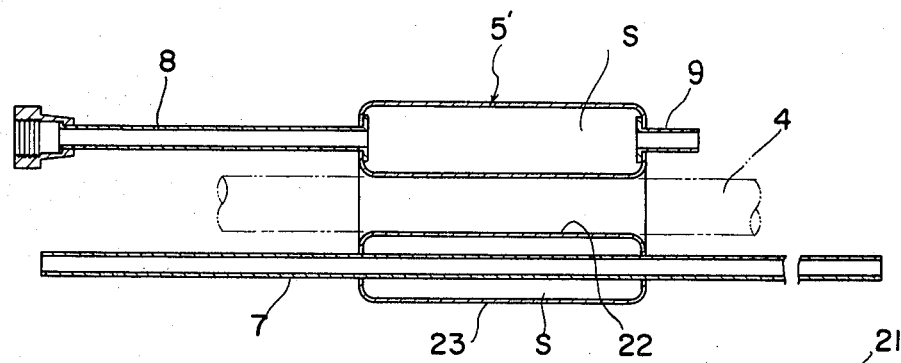
FIG. 7 is a side view in vertical section showing a modified bag member.

Referring to FIG. 1, a rock bolt 1 is shown settled in a hole 3 bored in an upwardly inclined direction in the ground 2 at the inner periphery of a tunnel. The rock bolt 1 comprises a bolt body 4 made of steel bar or the like and having one end screw threaded. The bolt body 4 is directly covered adjacent the one end thereof by a bag member 5 comprising a cloth such as of cotton or polyester or a sheet of synthetic resin (polyester, nylon, or vinyl), rubber or the like. Instead of being screw threaded at one end or the base end, the bolt body 4 may have a helical projection over its entire length. The bag member 5 used in this embodiment comprises a tubular cloth fitted on the bolt body 4 adjacent to one end thereof, with the longitudinal ends 5a and 5b affixed to the peripheral surface of the bolt body 4 by retainer means 17 comprising adhesive tapes. The bag member 5 is filled with packing material 6 such as mortar or cement paste, and is in tight contact with the inner wall surfaces of the hole 3 except at the longitudinal ends 5a and 5b. Where the bag member 5 comprises a permeable cloth, the packing material 6 filled into the bag member 5 exudes therefrom onto the inner wall of the hole 3 thereby to reinforce the contact between the bag member 4 and the inner wall of the hole 3. The retainer means 17 may comprise an adhesive agent or a combination of adhesive tapes 20 and rubber bands or the like which is described later.

The bolt body 4 has three tubes attached to the outer periphery thereof by means of adhesive tapes 20, which are a third tube 7 extending from one end of the bolt body 4 through the bag member 5 to a vicinity of the other end of the bolt body 4, a first tube 8 extending from the one end of the bolt body 4 toward the other end thereof and penetrating the bag member 5 to open into the interior of the bag member 5 as at 8a, and a second tube 9 having one end thereof opening into the interior of the bag member 5 as at 9a and extending through the bag member 5 to slightly protrude therefrom toward the other end of the bolt body 4. These tubes 7, 8 and 9 are made of synthetic resin. The first and second tubes 8 and 9 constitute a first tube means 15, and the third tube 7 constitutes a second tube means 16.

Number 21 indicates a protector cone securely attached to the extreme end of the bolt body 4 to prevent a forward end of the third tube 7 from getting plugged with earth at the time of inserting the bolt body 4 into the hole 3. The packing material 6 such as mortar or cement paste is present also in the hole 3 beyond the bag member 5. When the rock bolt shown in FIG. 1 is used in a downwardly bored hole, the second tube 9 may be shortened such that it slightly protrude from the bag member 5 toward the protector cone 21.

FIG. 2 is an enlarged perspective view of the portion of the rock bolt including the bag member 5, and shows the bag member 5 inflated with the packing material 6.

When the rock bolt 1 of the above described construction is inserted into the hole 3 bored in an upwardly inclined direction in the ground 2 at the inner periphery of the tunnel, the rock bolt 1 is inserted into the hole 3 with one end of the bolt body 4 forward, until the end of the bag member 5 at the other end of the bolt body 4 reaches the mouth of the hole 3. This insertion of the rock bolt 1 into the hole 3 is carried out easily since the bag member 5 is not filled with the packing member 6 at this stage. Then the packing material 6 is injected through the first tube 8. The packing material 6 pours out of the opening 8a of the first tube 8 into the interior of the bag member 5, whereby the bag member 5 is pressed against the inner wall of the hole 3 except at the ends thereof axially of the bolt body 4. Since the packing material is fluid, the bag member 5 is positively pressed against the inner wall of the hole 3 even if the hole 3 has a rugged wall surface adjacent its mouth. Therefore, once the packing material 6 has been filled into the bag member 5, the rock bolt 1 is fixed in the hole 3 and the gap between the wall surface of the hole 3 adjacent its mouth and the outer periphery of the bolt body 4 is positively closed by the bag member 5 inflated by the packing material. Then, on further injection of the packing material from the end of the first tube 8 at one end of the bolt body 4, the packing material 6 proceeds by way of the second tube 9 into the interior space of the hole 3 beyond the bag member 5 because the bag member 5 is already filled. At this time there is no possibility of the packing material 6 flowing out through the mouth of the hole 3 since the gap between the inner wall of the hole 3 adjacent its mouth and the outer periphery of the bolt body 4 is positively closed by the bag member 5. In other words, the bag member 5 acts as plug of the hole 3. The air inside the hole 3 which is driven to the depth of the hole 3 by the incoming packing material is smoothly let out of the hole by the third tube 7. When the packing material fills the hole 3 to its deep end, the packing material flows out of the hole 3 by the third tube 7, by which completion of the filling work is confirmed. Thereafter the rock bolt 1 is firmly settled in the hole 3 by the curing of the packing material in the bag member 5 and in the depth of the hole 3 beyond the bag member 5. Then a plate is mounted on the base end of the bolt body 4 for supporting the natural ground, and a nut is attached and tightened to the base end which has a screw thread.

As described, since the bag member 5 is not filled with the packing material 6 at the time of inserting the rock bolt into the hole 3, the rock bolt 1 is easily inserted into the hole 3. Further, the rock bolt 1 is firmly settled in the hole 3 since there is no possibility of the packing material 6 filled into the depth of the hole 3 beyond the bag member 5 flowing out through the mouth of the hole 3.

It is to be understood that the rock bolt 1 may be settled in the hole in the described order of operation where the hole 3 is bored in a vertically upward direction in the ground 2.

It is possible to substitute a tube 10 extending axially along the periphey of the bolt body 4 for the first tube 8 and the second tube 9, as shown in FIG. 3. The tube 10 extends from one end of the bolt body 4 through the bag member 5 to slightly protrude from the bag member 5 toward the other end of the bolt body 4, and includes a cut-out 10a at a position inside the bag member 5.

FIG. 4 shows a modified rock bolt 1 which is used where the hole 3 is bored in a downwardly inclined direction in the ground 2 as shown, or in a vertically downward direction or in a horizontal direction. This rock bolt 1 has a third tube 12 extending from one end of the bolt body 4 through the bag member 5 to slightly protrude from the bag member 5 toward the other end of the bolt body 4, a first tube 8 extending from the one end toward the other end of the bolt body 4 and penetrating the bag member 5 to open into its interior as at 8a, and a second tube 13 having one end thereof opening into the bag member 5 as at 13a and extending through the bag member 5 to a vicinity of the other end of the bolt body 4. These tubes 12, 8 and 13 are secured to the outer periphery of the bolt body 4 to extend axially thereof. This rock bolt is settled in the hole in the same manner as the foregoing embodiment. The packing material 6 is filled through the first and second tubes 8 and 13, and the air inside the hole 3 is evacuated by the third tube 12. The same effect is produced in this instance as in the foregoing embodiment. To summarize the difference between the foregoing embodiment and the embodiment of FIG. 4, the latter has the second tube 3 for filling the depth of the hole 3 with the packing material 6 extending to the extreme end of the bolt body 4, and the third tube 12 for letting out the air as short as to slightly protrude from the bag member 5 into the depth of the hole 3. The embodiment of FIG. 4 may be modified to include a tube only for filling the packing material 6 into the bag member 5 independently of a tube only for filling the packing material 6 into the depth of the hole 3, or the tube 10 having a cut out 10a as shown in FIG. 3, or the first tube 8 and the second tube 9 as shown in FIG. 1.

FIGS. 5 and 6 show a modified retainer means 17 for fixing the bag member 5 to the bolt body 4 more positively and in fluid-tight condition. The retainer means 17 of this embodiment comprises rings 18 and 18 of adhesive elastic material such as butyl rubber, silicon rubber or epoxy rubber fitted on the bolt body 4, leaves 19, 19, 19 and 19 of the same material as the rings 18 and 18 to secure the first, second and third tubes 8, 9 and 7 placed on the rings 18 and 18, and adhesive tapes 20 and 20 wound about the ends of the bag member 5 placed over the leaves 19, 19, 19 and 19 and the rings 18 and 18. As seen from FIG. 5, the bag member 5 is formed by first fitting a tubular sheet about the bolt body 4 and fixing to the bolt body 4 the end of the sheet opposed to the protector cone 21 at the extreme end of the bolt body 4, then turning back and pulling the other end of the sheet toward the base end of the bolt body 4 and fixing it to the bolt body 4. It will be understood that the end of the bag member 5 opposed to the protector cone 21 is tucked inside the bag member 5.

FIG. 7 shows a modified bag member 5' which differs from the described bag member 5 in itself having inner and outer peripheral walls 22 and 23. The bag member 5' provides a tubular space S for containing the packing material 6 when in use. The first tube 8 is connected to one end of the bag member 5' so as to open into the tubular space S. The second tube 9 has one end thereof inside the bag member 5' and the other end protruding from the bag member 5'. And the third tube 7 is fixed to the bag member 5' so as to penetrate the tubular space S. This unitary construction of the bag member 5' has the advantage of easiness in mounting on to the bolt body 4. Since the bag member 5' and the bolt body 4 are contacting each other across the inner peripheral wall 22, there is no possibility of the packing material 6 leaking therethrough.

Figure 8:
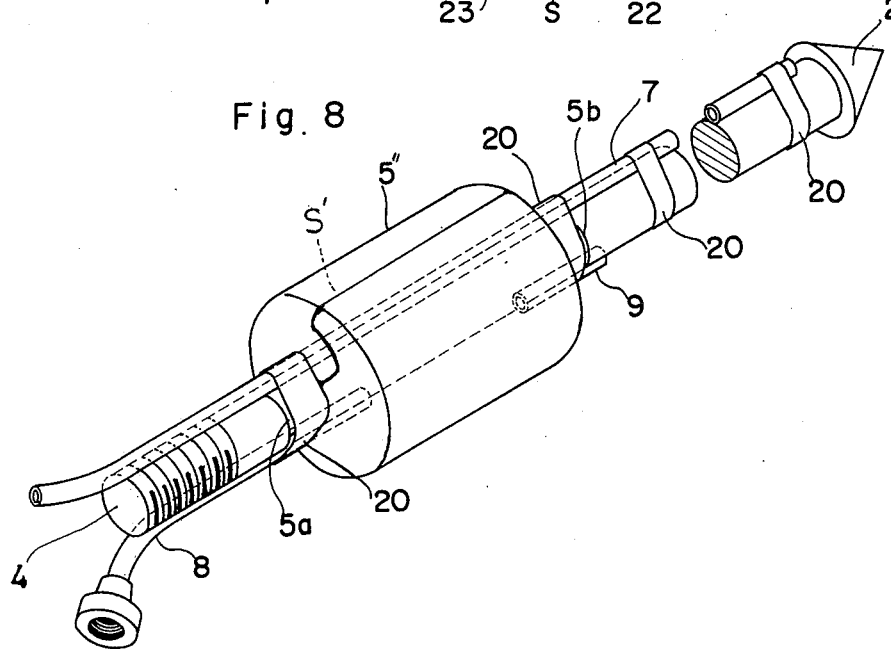
FIG. 8 is a perspective view showing another modified bag member.

FIG. 8 shows a further modification of the bag member 5. The bag member 5" here is the same as the bag member 5' in having itself inner and outer walls and providing a space S' for containing the packing material 6. The bag member 5" differs from the bag member 5' of FIG. 7 in that the bag member 5" is not in the tubular form but in a strip form. This bag member 5" is wrapped about the bolt body so that its lateral edges overlap each other peripherally of the bolt body 4 and this overlapping extend over the entire length of the bolt body 4. In the other respects the two bag members 5' and 5" are substantially the same. The bag member 5" has advantages over the bag member 5' having the tubular space S in that the former is less expensive to manufacture and easier to mount on and dismount from the bolt body 4.

We claim:

1. A rock bolt for insertion into a hole comprising:
   a rock bolt body;
   inflatable bag means surrounding the outer periphery of said body adjacent one end thereof;
   retainer means for securely fixing said bag means to said body;
   injection tube means extending from adjacent said one end of said body through said bag means for communicating with the interior of said bag means for feeding packing material into said bag means to inflate said bag means and also for communicating with the space defined between the walls of said hole, said bolt body, and said bag means for feeding said material into said space after said bag means is inflated, said tube means comprising a tube having a cut-out portion in said bag means; and
   exhaust tube means extending through said bag means from adjacent said one end of exhausting air from said space as said material is fed into said space.

2. A bolt as in claim 1, wherein said injection tube means includes a first tube extending from adjacent said one end into said bag means and a second tube extending from the interior of said bag means into said space.

3. A bolt as in claim 1 or 2 wherein said retainer means comprises adhesive tapes for fixing said bag means at both longitudinal ends thereof.

4. A bolt as in claim 3, wherein said retainer means comprises adhesive elastic rings fitted about said body and a plurality of adhesive elastic leaves for retaining said first and second tube means on portions of said rings, said tapes being wound about the longitudinal ends of said bag means over said leaves and rings.

5. A bolt as in claim 1 or 2 wherein said retainer means comprises an adhesive agent.

6. A bolt as in claim 1 or 2 wherein said bag means comprises a sheet member formed into a cylindrical shape and having longitudinal ends thereof secured to the outer periphery of said body.

7. A bolt as in claim 1 or 2 wherein said bag means comprises a sheet member defining a tubular space for receiving said packing material.

8. A bolt as in claim 7, wherein said bag means is cloth.

9. A bolt as in claim 7, wherein said bag means is synthetic resin sheet.

10. A bolt as in claim 7, wherein said bag means is in the form of a strip including a space for receiving packing material and wound about said body.

* * * * *